United States Patent [19]

Peddinghaus

[11] Patent Number: 4,600,099
[45] Date of Patent: Jul. 15, 1986

[54] TRANSVERSE CONVEYOR OF ELONGATED WORKPIECES

[76] Inventor: Rolf Peddinghaus, Deterbergerstr. 25k, 5828 Ennepetal, Fed. Rep. of Germany

[21] Appl. No.: 645,602

[22] Filed: Aug. 29, 1984

[30] Foreign Application Priority Data

Aug. 31, 1983 [DE] Fed. Rep. of Germany ....... 3331341

[51] Int. Cl.$^4$ ....................... B65G 25/02; B65G 25/10
[52] U.S. Cl. ................................. 198/774; 198/468.6
[58] Field of Search ............... 198/744, 746, 487, 747, 198/748, 468.6, 774

[56] References Cited

U.S. PATENT DOCUMENTS

| | | | |
|---|---|---|---|
| 671,440 | 4/1901 | Huber | 198/746 |
| 1,567,473 | 12/1925 | Starr | 198/746 |
| 2,434,632 | 1/1948 | Young | 198/746 |
| 2,556,100 | 6/1951 | Nanninga | 198/774 |
| 4,075,949 | 2/1978 | Davis et al. | 198/744 |
| 4,114,767 | 9/1978 | Fur | 198/744 |
| 4,353,457 | 10/1982 | Haley | 198/468.6 |
| 4,440,292 | 4/1984 | Regenbrecht | 198/774 |
| 4,523,672 | 6/1985 | Navarro | 198/744 |

FOREIGN PATENT DOCUMENTS

| | | | |
|---|---|---|---|
| 1096284 | 12/1960 | Fed. Rep. of Germany | 198/746 |
| 2235361 | 2/1973 | Fed. Rep. of Germany | 198/744 |
| 151288 | 10/1981 | German Democratic Rep. | 198/468.6 |
| 437671 | 1/1975 | U.S.S.R. | 198/744 |

*Primary Examiner*—Joseph E. Valenza
*Assistant Examiner*—Daniel R. Alexander
*Attorney, Agent, or Firm*—Karl F. Ross; Herbert Dubno

[57] ABSTRACT

A conveyor for transporting an elongated workpiece in a normal horizontal transport direction and generally perpendicular to the workpiece has a rail extending horizontally in the normal transport direction. A carriage rides on the rail in the transport direction and pivotally carries a pair of end links at respective generally parallel support axes extending horizontally generally perpendicular to the transport direction and spaced apart in the transport direction. A lifting member is pivoted on the end links at respective member axes generally parallel to and offset from the support axes. A lower link pivoted on the end links below the lifting member forms with the lifting member and end links a parallelogrammatic linkage which is movable between a raised position with the member projecting above the rail and a lowered position with the member below the upper rail surface. A spring urges the linkage into the upper position. A stop pawl is pivotal on one of the links in the lowered position of the linkage between an up position projecting upward beyond the upper rail surface and a down position below the upper rail surface. This stop pawl lies below the upper rail surface in the raised position of the linkage. Thus on movement of the carriage along the rail opposite to the transport direction with the linkage in the lowered position the pawl can be deflected against the force of its spring into its down position so the carriage can pass under a workpiece and on movement in the transport direction the stop pawl engages a workpiece sitting on the upper rail surface without such downward deflection and can push it.

11 Claims, 6 Drawing Figures

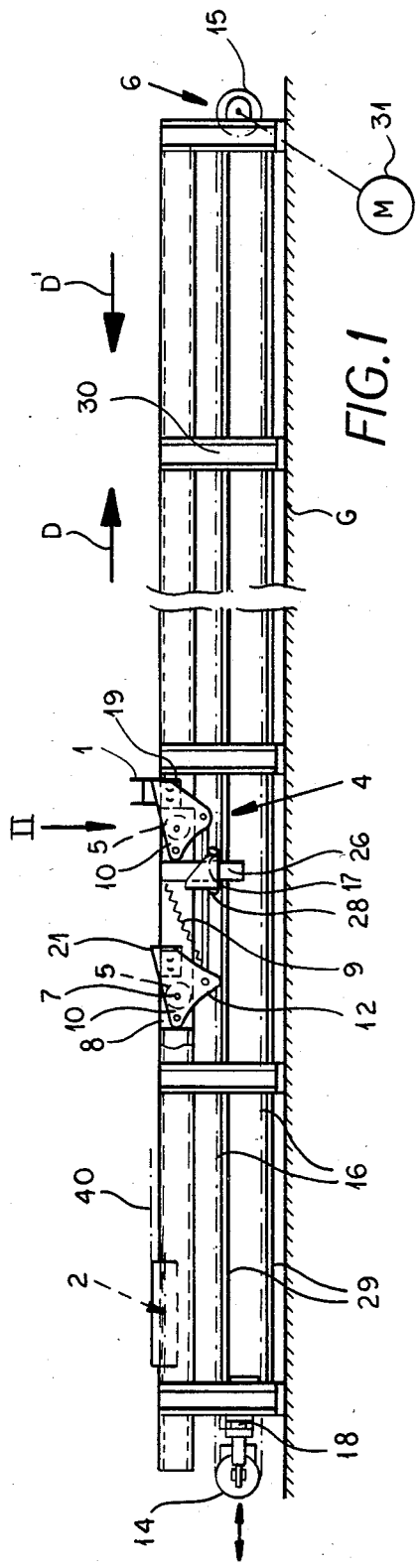
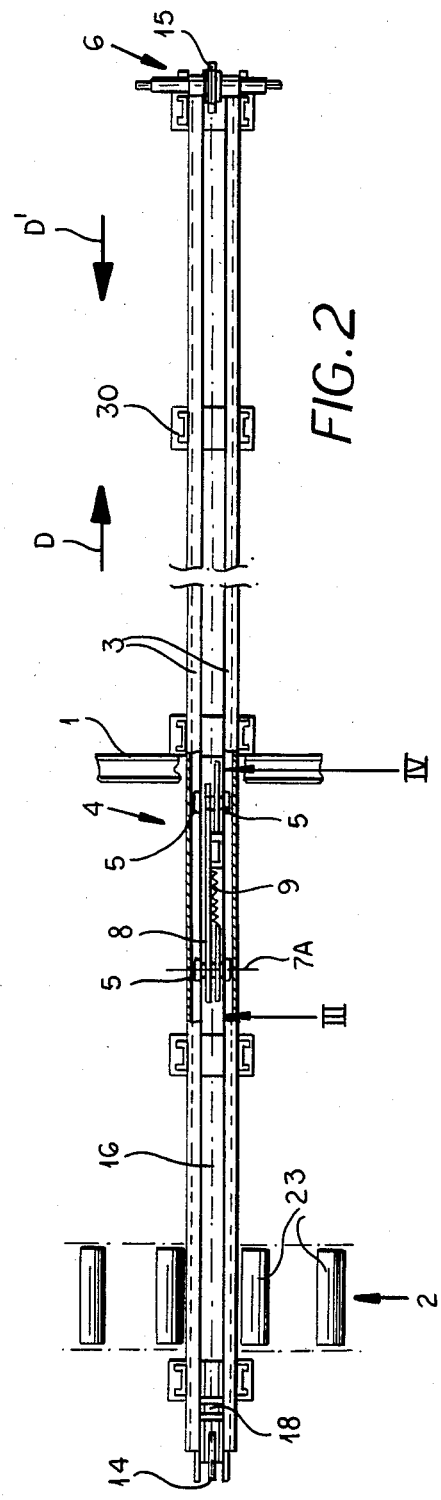

4,600,099

TRANSVERSE CONVEYOR OF ELONGATED WORKPIECES

FIELD OF THE INVENTION

The present invention relates to a transverse conveyor for elongated workpieces. More particularly this invention concerns such a conveyor that is used in a steel mill or the like to move large profile beams between production lines.

BACKGROUND OF THE INVENTION

A conveyor of this type is known which, for example, is used to transport rolled profile beams in a rolling mill in a horizontal transport direction perpendicular to the length of the beams from the end of the rolling line to a temporary storage location or another treatment stage. Normally a plurality of transverse conveyors are provided that operate synchronously and that all extend parallel to one another from an input conveyor to an output conveyor.

A known such conveyor (see U.S. Pat. No. 4,440,292) has a horizontal rail extending in the direction and having an upper rail surface and a carriage riding on the rail and displaceable in the direction along the rail. A pair of similar end links spaced apart in the direction are pivotal on the carriage about respective generally parallel support axes extending horizontally generally perpendicular to the direction and spaced apart in the direction. A lifting member is pivoted on the end links at respective member axes generally parallel to and offset from the support axes and has an upper horizontal member surface. A lower link pivoted on the end links at lower axes generally parallel to and offset from the respective member axes forms a parallelogrammatic linkage with the lifting member and end links. This linkage is movable between a raised position with the upper member surface above the rail and a lowered position with the upper member surface below the upper rail surface. A spring engaged with the linkage urges same into the lower position.

A flexible element spanned over front and rear wheels at the respective ends of the rail has a front end operatively connected to the carriage and a rear end secured to one of the end links at a location offset from the respective support axis. A drive can tension the element downstream relative to the normal transport direction to pull the carriage in the transport direction, and can tension the element upstream of the carriage to pivot the end links between the raised and lowered positions.

In addition the lifting member is provided with upstanding stops that project above the upper rail surface in the raised and lower positions of the linkage. Thus the carriage can be moved in the transport direction while in the lowered position to engage these stops against the downstream edge of a workpiece, thereby aligning the workpiece on the transverse-conveyor rails by sliding it a short distance in the transport direction until it engages all the stops of the synchronously moving transverse conveyors. Then the lifting member is raised to pick up the aligned workpiece and carry it with substantially less friction and work forward to the downstream end of the rail.

Even if the parallelogrammatic linkage is set up to allow the stops to be dropped below the workpiece-support plane defined by the upper surface of the rail, this requires a very substantial vertical displacement of the lifting member between uppermost and lowermost positions, and requires that this large displacement be made each time the carriage is returned opposite the normal transport direction. Once thus dropped it is then necessary to again raise the lifting member to engage the stops with the downstream workpiece edge.

OBJECTS OF THE INVENTION

It is therefore an object of the present invention to provide an improved transverse conveyor for an elongated workpiece.

Another object is the provision of such a transverse conveyor for an elongated workpiece which overcomes the above-given disadvantages, that is which is of simple construction and operation, yet which allows the conveyor to accurately and efficiently align and transport workpieces.

SUMMARY OF THE INVENTION

A conveyor for transporting an elongated workpiece in a horizontal normal transport direction and generally perpendicular to the workpiece has a rail extending horizontally in the normal transport direction and having an upper rail surface, a front rail end, and a rear rail end. A carriage rides on the rail in the direction and pivotally carries a pair of end links at respective generally parallel support axes extending horizontally generally perpendicular to the direction and spaced apart in the direction. A lifting member having an upper horizontal member surface is pivoted on the end links at respective member axes generally parallel to and offset from the support axes. A lower link pivoted on the end links at lower axes generally parallel to and offset from the respective member axes forms a parallelogrammatic linkage with the lifting member and end links. This linkage is movable between a raised position with the upper member surface above the rail and a lowered position with the upper member surface below the upper rail surface, a spring being engaged with the linkage and urging same into the lower position. According to the invention a stop pawl is pivotal on one of the links in the lowered position of the linkage between an up position projecting upward beyond the upper rail surface and a down position below the upper rail surface. The stop pawl lies below the upper rail surface in the raised position of the linkage. Another spring is engaged between the one link and the stop pawl for urging same into the up position. Thus on movement of the carriage along the rail opposite to the direction with the linkage in the lowered position the pawl can be deflected against the force of its spring into its down position so the carriage can pass this workpiece and on movement in the opposite direction the stop pawl engages a workpiece sitting on the upper rail surface without such downward deflection and can push it. Respective front and rear wheels at the respective ends of the rail carry a flexible element having a front end operatively connected to the carriage and a rear end secured to one of the end links at a location offset from the respective support axis. A drive can tension the element downstream relative to the normal transport direction to pull the carriage in the transport direction, and can tension the element upstream of the carriage to pivot the end links between the raised and lowered positions.

According to another feature of this invention, in the lowered position of the linkage and the up position of the stop pawl, same has a pusher flank facing downstream in the transport direction and generally perpendicular to the upper surfaces and a ratchet flank extending backward in the transport direction from the pusher flank, facing upward and generally upstream in the transport direction, and forming a large obtuse angle with the surfaces. In addition the linkage is displaceable on moving between the raised and lowered positions through an intermediate position with the upper member surface and link both lying wholly below the upper rail surface.

With the system of this invention the carriage need merely be moved between the fully lowered and raised positions, representing a substantial economy of motion and ease of operation since in one of these positions any reasonable tension over a certain limit will lock the carriage in the raised position while a substantial relaxation of tension in the back stretch to a level just sufficient to keep it taut or move the carriage will put the linkage in the lowered position. The intermediate position, normally set with the help of position-responsive switches not absolutely necessary for the other two positions, is the only one which takes any sensitive control technology.

The instant invention therefore takes an existing drive arrangement hitherto only used to raise and lower the lifting elements and the stops fixed thereon and, by a simple kinematic rearrangement of parts, allows the system to operate in a third mode in which it can be moved in either direction past the workpieces. This third position is obtained at no increase in working parts, and allows the transverse conveyor according to the invention to operate in a very flexible manner.

In accordance with another feature of this invention the support, member, and link axes are all parallel and spaced from one another. The support axis lies generally between the member and link axes and the link axes lie generally below the support axes. The carriage is formed mainly of respective front and back axles at the respecive support axes and respective front and rear rollers carried on the axles and riding on the rail and each such axle carries two such coaxial rollers both engaging the rail. The rail for such a carriage has two confronting at least L-section, but normally C-section, beams each supporting one of the front rollers and the respective rear roller.

Extreme stability is obtained when the lifting beam, lower link, and end links are axially flanked by the wheels. In this arrangement each end link is a generally triangular upright plate generally centrally traversed by the respective axle and having one arm connected to the respective beam end and another arm connected to the respective link end, the one link having yet another arm carrying the stop. In fact both such other arms can be provided with such stops.

DESCRIPTION OF THE DRAWING

The above and other features and advantages will become more readily apparent from the following, reference being made to the accompanying drawing in which:

FIG. 1 is a small-scale side view of the conveyor system according to this invention;

FIG. 2 is a top view of the system of FIG. 1, taken in the direction of arrow II of FIG. 1;

SPECIFIC DESCRIPTION

Figure 3:
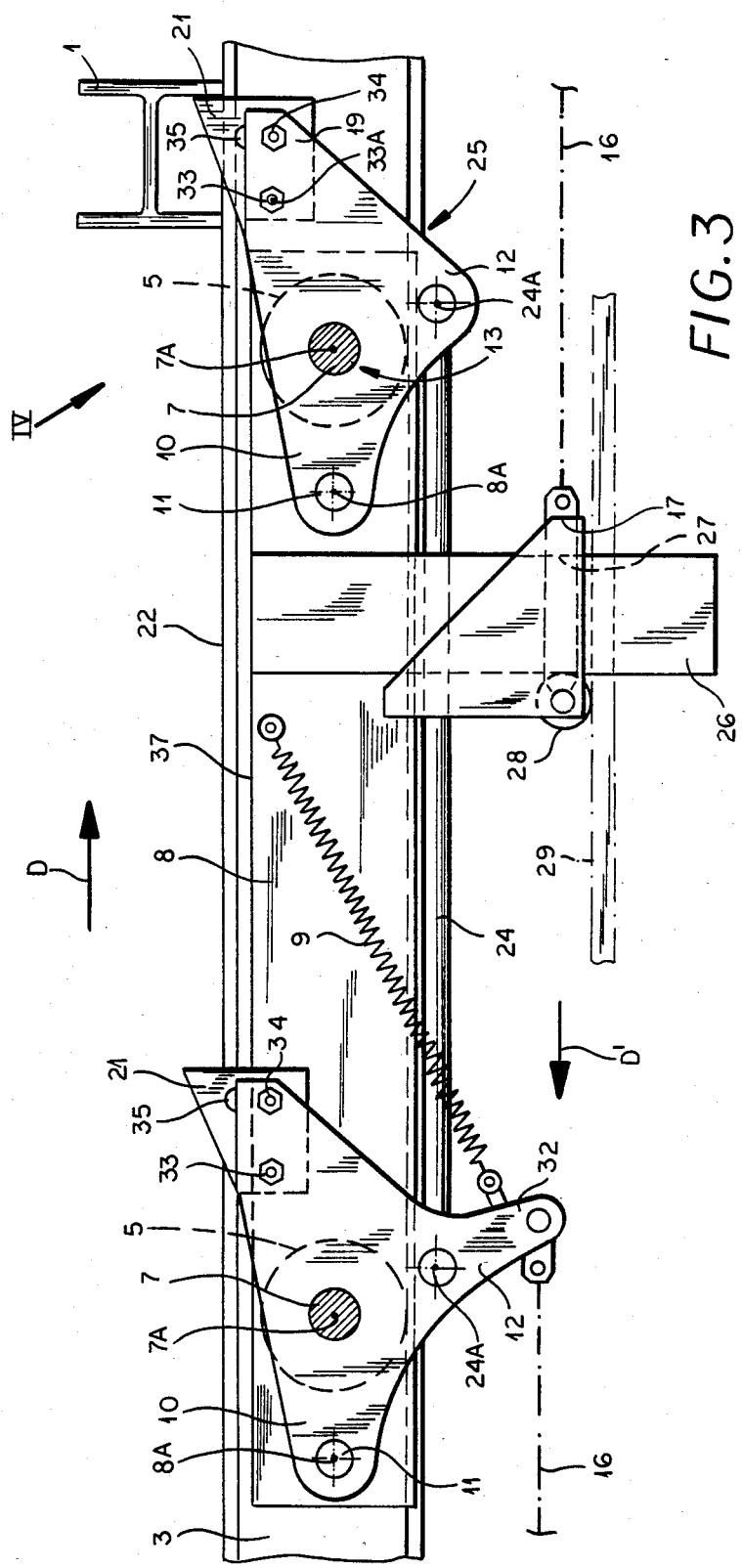
FIG. 3 is a large-scale vertical section taken along line III—III of FIG. 2.

As seen in FIGS. 1 and 2 the conveyor according to this invention serves to transport workpieces 1 in a back-to-front or, as seen in the drawing, left-to-right transport direction D that extends horizontally perpendicular to the longitudinal directions defined by these workpieces 1. A conveyor 2 formed of a transversely extending horizontal row of rollers 23 feeds these workpieces 1 perpendicular to the direction D to the upstream end of a track formed by two facing and stationary C-section rails 3 supported above the ground G on posts 30. The upper extents of the rollers 23 of the conveyor 2 define a plane 40 slightly above and parallel to a horizontal support plane 22 defined by the upper surfaces of the rails 3. Normally at least two such sets of rails 3 with the further structure described below are provided next to each other to engage each workpiece 1 at several locations along its length, and another such longitudinal conveyor 2 is provided at the front or, as seen in the drawing, right end of the transverse conveyor of this invention. All the transverse conveyors are operated synchronously.

A conveyor carriage 4 can move along the rails 3 in the direction D by means of a drive 6 and has front and back pairs of coaxial rollers 5 received in the rails 3 and carried on parallel front and back axles 7 defining parallel and horizontal rotation axes 7A. Since the rails 3 are stationary, these axes 7A cannot move vertically, but can move in the direction D. Carried on each front and back axle 7 is a three-arm link plate 25 that therefore can rotate about the respective axis 7A. These front and back plates 25 each have one arm 10 journaled at a respective axis 8A on a respective pivot pin 11 fixed in the respective front or back end of a transport beam 8, another arm 12 in which the respective front or back end of a rigid link 24 is pivoted at a respective axis 24A, and another arm 19 provided with a stop 21. The above-described structure therefore forms a parallelogrammatic linkage having an upper link 8, a lower link 24, and two side links 25 which are in turn pivoted about respective vertically fixes axes 7A.

The stop 21 is formed as a right-trapezoidal plate pivoted about an axis 33A defined by a respective pivot pin 33 on the plate 25 and guided by another pin 34 that fits within an arcuate slot 35 centered on the respective axis 33A. Respective compression springs 20 braced against abutments 36 urge the abutments plates 21 counterclockwise about the respective axes 33A.

The drive 6 comprises a flexible but inextensible element 16 spanned between a drive wheel 15 at the front of the transverse conveyor and an idler wheel 14 at the back of this conveyor. A motor 31 is provided to rotate the wheel 15 and the wheel 14 is limitedly displaceable in the direction D by a hydraulic ram or actuator 18. One end of this element 16 is connected at the outer end of an extension 32 of the rear link arm 12, and a tension spring 9 has its rear end hooked on this extension 32 and its front end hooked on the beam 8 between the axes 7A. The opposite end of the chain 16 is connected to a small entrainment carriage 17 that rides via a roller 28 on a lower guide rail 29 supported below the rails 3 on the posts 30. A pendant entrainment post 26 fixed on the beam 8 between the axes 7A is vertically slidable in guide hole 27 that vertically traverses this carriage 17. As movement by the conveyor according to this invention is back to front, that is from left to right in the drawing, it is therefore apparent that the position of the carriage 4 along the rails 3 is determined wholly by rotation of the sprocket wheel 15.

Figure 4:
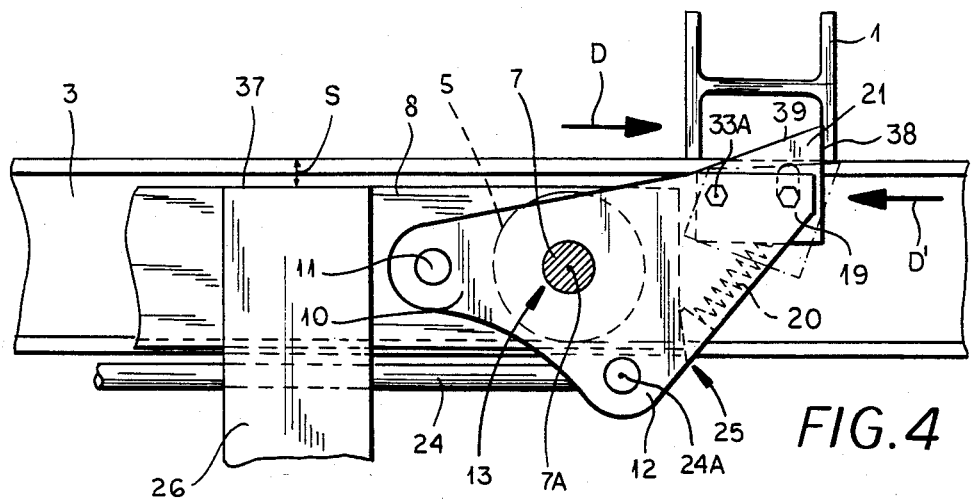
FIG. 4 is the detail indicated at IV in FIG. 3, with the lifting/transport beam in its lowest position and the stop raised.
Figure 5:
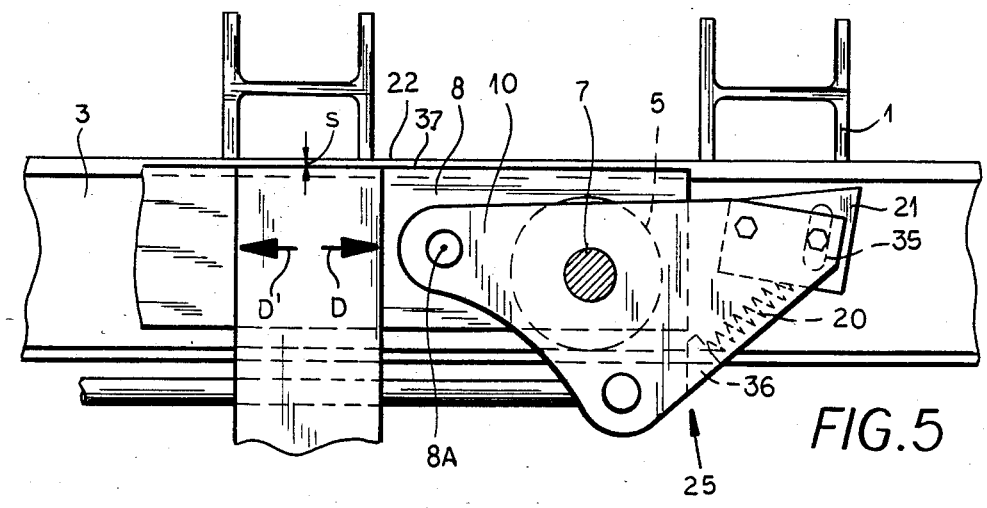
FIGS. 5 and 6 are views like FIG. 4 but respectively showing the stop lowered and the beam partially raised, and the beam fully raised and the stop still lowered.
Figure 6:
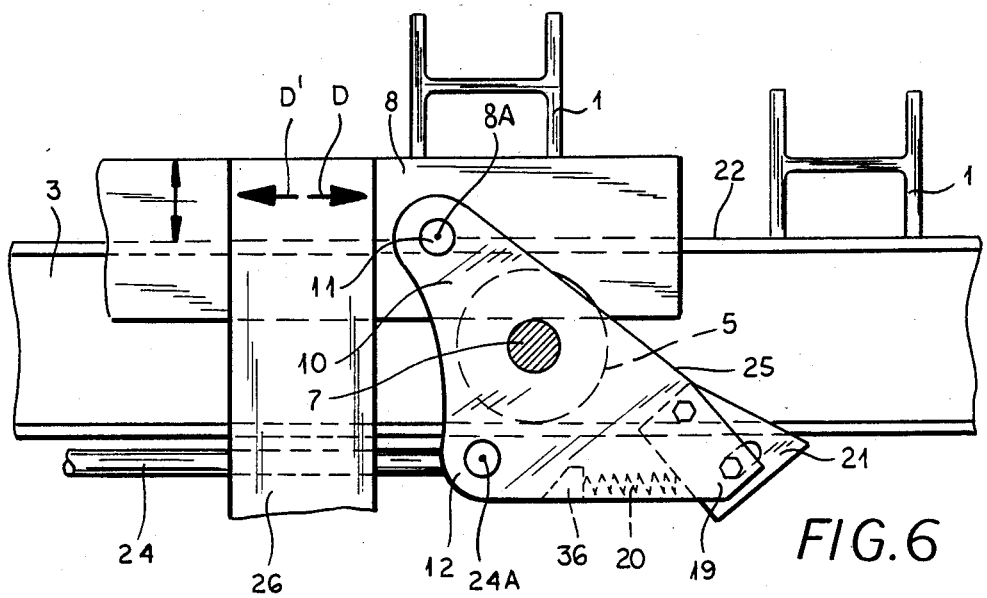

The actuator 18 can displace the wheel 14 to pull the lower end of the extension 32 back, in a direction D' opposite to direction D to move the entire carriage 4 between the lower, intermediate, and upper positions shown respectively in FIGS. 4, 5, and 6. Since orientation of the axes 8A, 7A, and 24A is identical on both link plates 25 and they are connected together in a parallelogrammatic linkage hung from the vertically nondisplaceable axes 7A, this will move the beam 8 perfectly parallel to the rails 3 between the illustrated positions. Operation is as follows:

When the tension in the drive element 16 in the back chain stretch between the wheel 15 and the extension 32 is less than the force of the spring 9, the system will be in the extreme lower position of FIGS. 3 and 4. In this position the upper surface 37 of the beam 8 is a spacing S below the rail support plane 22 and the links 25 also lie wholly below this plane 22, but the stops 21 project thereabove, each with one forward-facing flank 38 substantially perpendicular to the plane 22 and a backward-facing flank 39 which is inclined at a large obtuse angle to this plane 22. In this position, therefore, if the carriage 4 is moved by the drive motor 31 to the right, in direction D, the stops 21 will flatly engage the flanges of any workpieces 1 resting on the surface 22 with their pusher flanks 38. Such action is typically done to push several workpieces 1 together or to align the workpieces 1 perfectly perpendicular to the direction D, but is not used for general transport as sliding the workpieces 1 on the rails 3 can damage both workpieces 1 and rails 3 while being a great deal of work.

Reverse displacement in direction D' will engage the inclined camming flanks 39 with the workpieces 1 so that the stop 21 will simply be pushed down against the force of its spring 20 as illustrated in dot-dash lines in FIG. 4 and the carriage will pass under the workpiece 1, the stop snapping back up once the workpiece 1 is passed. The operator of the system therefore backs up the carriages 4 until all the stops 21 snap up behind a workpiece 1, then advances the carriages 4 until all the stops 21 come to rest with their pusher flanks 38 against the thus aligned workpiece 1 for further transport as described below. The spring 9 is quite stiff and the spring 20 quite soft so that when displaced backward in the direction D' the slight extra tension applied to the back stretch, that is the lower stretch and left-hand end of the upper stretch, of the element 16 does not change the angular position of the plate 25.

Partial extension of the actuator 18 will pivot the link plates 25 into the position of FIG. 5, with the upper surface 37 of the beam 8 a slight spacing s below the support plane 22, and with the entire stop 21 also below this plane 22. In this position the carriage 4 can be moved in either transverse direction D or D' underneath the workpieces 1 without touching them. This is useful when a particular workpiece is to be shifted or aligned, or just the end workpieces are to be pushed or picked off the rails 3.

Once the beam 8 is under a workpiece 1 that has been aligned and that is to be transported a meaningful distance, the actuator 18 is fully extended to raise the beam 8 to the position of FIG. 6, with its surface 37 well above the surface 22. In this position the drive 6 can move the lifted workpiece 1 in either direction D or D' relatively easily, as the carriage 4 rolls smoothly on the rollers 5.

The system of this invention therefore allows the carriage 4 to be moved back simply by releasing the tension on the back cable stretch to a level just sufficient to keep it taut and move the carriage, and is moved oppositely in the standard manner by tensioning the downstream or front chain stretch between the drive wheel and the entrainment carriage 17. These are the two main positions the device is used in and are obtained and held very easily. The third position of FIG. 5 is achieved in a simple manner using the same drive elements.

I claim:

1. A conveyor for transporting an elongated workpiece in a normal transport direction that is horizontal and generally perpendicular to the workpiece, the conveyor comprising:

a rail extending horizontally in the normal transport direction and having an upper rail surface, a front rail end, and a rear rail end;

a carriage riding on the rail and displaceable therealong in the transport direction;

a pair of end links pivoted on the carriage at respective generally parallel support axes extending horizontally generally perpendicular to the transport direction and spaced apart in the transport direction;

a lifting member having an upper horizontal member surface and pivoted on the end links at respective member axes generally parallel to and offset from the respective support axes;

a lower link pivoted on the end links at lower axes generally parallel to and offset from the respective member axes and forming a parallelogrammatic linkage with the lifting member and end links, the linkage being movable between a raised position with the upper member surface above the rail and a lowered position with the upper member surface below the upper rail surface;

a spring engaged with the linkage and urging same into the lowered position;

a stop pawl pivotal on one of the end links in the lowered position of the linkage between an up position projecting upward beyond the upper rail surface and a down position below the upper rail surface, the stop pawl lying below the upper rail surface in the raised and intermediate positions of the linkage;

spring means engaged between the one end link and the stop pawl for urging same into the up position, the pawl being shaped such that on movement of the carriage along the rail opposite to the transport direction with the linkage in the lowered position a workpiece on the rail can deflect the pawl against the force of its spring into its down position and the carriage can pass under the workpiece and on movement in the transport direction the stop pawl engages a workpiece sitting on the upper rail surface without such downward deflection and can push it in the transport direction;

respective front and rear wheels at the respective ends of the rail;

a flexible element spanned over the wheels and having a front end operatively connected to the carriage and a rear end secured to one of the end links at a location offset from the respective support axis; and drive means for tensioning the element downstream relative to the normal transport direction and thereby pulling the carriage in the transport direction, and for tensioning the element upstream of the carriage and thereby pivoting the end links between the raised and lowered positions.

2. The transverse conveyor defined in claim 1 wherein, in the lowered position of the linkage and the up position of the stop pawl, the stop pawl has a pusher flank facing downstream in the transport direction and generally perpendicular to the upper surfaces and a ratchet flank extending backward in the transport direction from the pusher flank, facing upward and generally upstream in the transport direction, and forming a large obtuse angle with the surfaces.

3. The transverse conveyor defined in claim 1 wherein the support, member, and link axes are all parallel and spaced from one another, the support axis lying generally between the member and link axes and the link axes lying generally below the support axes.

4. The transverse conveyor defined in claim 1 wherein the carriage is formed mainly of respective front and back axles at the respective support axes and respective front and rear rollers carried on the axles and riding on the rail.

5. The transverse conveyor defined in claim 4 wherein each such axle carries two such coaxial rollers both engaging the rail.

6. The transverse conveyor defined in claim 5 wherein the rail has two confronting at least L-section beams each supporting one of the front rollers and the respective rear roller.

7. The transverse conveyor defined in claim 5 wherein the lifting member, lower link, and end links are axially flanked by the wheels.

8. The transverse conveyor defined in claim 4 wherein each end link is a generally triangular upright plate generally centrally traversed by the respective axle and having one arm connected to the respective end of the lifting member and another arm connected to the respective end of the lower link, the one link having yet another arm carrying the stop.

9. The transverse conveyor defined in claim 4 wherein both of the end links carry such stops and each end link is a generally triangular upright plate generally centrally traversed by the respective axle and having one arm connected to the respective lifting-member end, another arm connected to the respective lower-link end, and yet another arm carrying the respective stop.

10. The transverse conveyor defined in claim 8 wherein the spring is engaged between the lifting member and the other arm connected to the respective lower-link end of one of the links.

11. The transverse conveyor defined in claim 1 wherein both such end links carry such stops.

* * * * *